United States Patent [19]

Mastuoka

[11] Patent Number: 5,572,812
[45] Date of Patent: Nov. 12, 1996

[54] NUMBER PLATE INCLUDING LUMINOUS CHARACTERS

[75] Inventor: Masaaki Mastuoka, Tokyo, Japan

[73] Assignee: World Auto Plate Ltd., Tokyo, Japan

[21] Appl. No.: 262,221

[22] Filed: Jun. 20, 1994

[30] Foreign Application Priority Data

Jun. 25, 1993 [JP] Japan ............... 5-039279 U
Aug. 23, 1993 [JP] Japan ............... 5-050129 U

[51] Int. Cl.⁶ ................................. G09F 13/02
[52] U.S. Cl. ................. 40/204; 40/579; 40/576; 40/564; 361/785; 362/800
[58] Field of Search ............... 40/204, 205, 206, 40/580, 579, 576, 575; 361/785; 362/800, 83.3, 80.3

[56] References Cited

U.S. PATENT DOCUMENTS

| 4,532,579 | 7/1985 | Merrymann | 40/576 |
| 5,007,190 | 4/1991 | Shyu | 40/576 |
| 5,408,773 | 4/1995 | Hwang | 40/576 |

FOREIGN PATENT DOCUMENTS 575725  5/1933  Germany ............... 40/204
102299  1/1978  Japan ............... 40/576

*Primary Examiner*—Kenneth J. Dorner
*Assistant Examiner*—Cassandra Davis
*Attorney, Agent, or Firm*—Koda and Androlia

[57] ABSTRACT

A number plate including luminous characters is usually mounted below head lamps of a vehicle. As essential components, this number plate includes a front plate having a plurality of character portions punched therefrom, a plurality of characters each molded of a transparent or translucent synthetic resin and adhesively fitted into the character portions, a plurality of light emitting diode assemblies arranged on the rear surface side of the front plate at the positions located corresponding to the character portions, a cover secured to the rear surface of the front plate and having the light emitting diode assemblies accommodated therein, and a plurality of base boards having the light emitting diode assemblies arranged at the positions located corresponding to the character portions. In addition, the cover includes a support member for supporting the base boards which are connected to each other in the side-by-side relationship. Each of the base boards includes a printed conductor which is electrically connected to an anode terminal or a ground terminal via the light emitting diode assemblies. The interior of the cover is filled with a transparent synthetic resin.

6 Claims, 2 Drawing Sheets

5,572,812

NUMBER PLATE INCLUDING LUMINOUS CHARACTERS

BACKGROUND OF THE INVENTION

1. Field of the Invention

The present invention relates generally to a vehicular number plate including luminous characters, numerals or similar marks. More particularly, the present invention relates to a number plate of the foregoing type which assures that the number plate can not intentionally be falsified in order to indicate another characters, numerals or similar marks on the front surface thereof, it exhibits excellent durability, and it can be fabricated at an inexpensive cost.

2. Description of the Related Art

A hitherto known number plate including luminous characters, numerals or similar marks (hereinafter referred to simply as a luminous number plate) is typically constructed as shown in FIG. 4 to FIG. 6. Specifically, the luminous number plate includes a flat case 1 to which an openable frame 2 is turnably fitted. A front plate 4 coated with a paint having a specified color is attached to the frame 2 to serve as a so-called number plate by tightening set screws. The number plate 4 has a plurality of character portions 3 punched therefrom to which characters 31 each molded of a transparent synthetic resin are adhesively secured. To illuminate the character portions 3 at night, two bulbs 5 are disposed inside of the flat case 1.

With the conventional luminous number plate as constructed in the above-described manner, when the characters 31 are illuminated by the bulbs 5, they can visually be recognized from remote locations. However, it has been found that the conventional luminous number plate has a drawback that the respective characters 31 are illuminated in a different manner such that the characters located directly above the illuminating bulbs 5 are brightly illuminated but the characters located remote from the illuminating bulbs 5 are hardly visually recognized.

To obviate the foregoing drawback, a translucent milk-white light scattering plate 7 (see FIG. 6) having black paints 6 coated and baked in the regions corresponding to the illuminating bulbs 5 while having a thickness gradually reduced toward the peripheral part thereof is interposed between the front plate 4 and the bulbs 5 so as to allow a quantity of light beam measured directly above the bulbs 5 or in the vicinity of the same to be reduced in order to assure that character portions 3 are uniformly illuminated (refer to an official gazette of Japanese Utility Model publication No. 16,308/1978).

With the conventional luminous number plate constructed in that way, since reversionless type set screws are used for fixedly securing it to the openable frame 2, once the front plate 4 is fixed to the openable frame 2 by tightening the reversionless type set screws, the former can not be disconnected from the latter. However, the front plate 4 can not always be disconnected from the openable frame 2 because of the employment of the reversionless type set screws. When it is assumed that the front plate 4 is forcibly disconnected from the openable frame 2 by actuating a certain tool, there is a possibility that the characters 31 are removed or disconnected from the character portions 3 to that they are exchaged with another ones.

SUMMARY OF THE INVENTION

The present invention has been made in consideration of the aforementioned background.

A primary object of the present invention is to provide a number plate including luminous characters wherein the number plate assures that it is impossible to falsely replace or exchange a plurality of characters on the number plate with another ones.

A secondary object of the present invention is to provide a number plate including luminous characters wherein the number plate assures that it is possible to reduce the total number of light emitting diodes practically used for the number plate to serve as a light source.

According to one aspect of the present invention, there is provided a number plate including luminous characters wherein the number plate comprises a front plate having a plurality of character portions punched therefrom to serve as a so-called number plate, a plurality of characters each molded of a transparent or translucent synthetic resin, the character being adhesively fitted into the character portions, a plurality of light emitting diode assemblies arranged on the rear surface side of the front plate at the positions located corresponding to the character portions, a cover secured to the rear surface of the front plate and having the light emitting diode assemblies accommodated in the interior of the cover, and a transparent synthetic resin filled in the interior of the cover so as to allow the light emitting diode assemblies to be embedded in the transparent synthetic resin.

In addition, according to other aspect of the present invention, thare is provided a number plate including luminous cgaracters wherein the number plate comprises a front plate having a plurality of character portions punched therefrom to serve as a so-called number plate, a plurality of characters each molded of a transparent or translucent synthetic resin, the characters being adhesively fitted into the character portions, a plurality of light emitting diode assemblies arranged on the rear surface side of the front plate at the positions located corresponding to the character portions, a cover secured to the rear surface of the front plate and having the light emitting diode assemblies accommodated in the interior of the cover, and a plurality of base boards having the light emitting diode assemblies arranged at the positions located corresponding to the character portions, the printed base boards being connectable to and disconnectable from each other.

The number plate constructed according to the present invention has an advantage that it is impossible to falsify the number plate, because the light emitting diode assemblies are embedded in the transparent synthetic resin. In addition, since the light emitting diode assemblies each having the same contour as that of each character portion are arranged on the rear surface side of the front plate in such a manner that they can be assemblied and disassembled, and moreover, separate away from each other, another advantages of the number plate of the present invention is that the total number of light emitting diodes practically used for the number plate can be reduced compared with the conventional number plate.

Other objects, features and advantages of the present invention will become apparent from reading of the following description which has been in conjunction with the accompanying drawings.

BRIEF DESCRIPTION OF THE DRAWINGS

The present invention is illustrated in the following drawings in which.

DESCRIPTION OF THE PREFERRED EMBODIMENT

The present invention will now be described in detail hereinafter with reference to the accompanying drawings which illustrate a preferred embodiment thereof.

Figure 1:
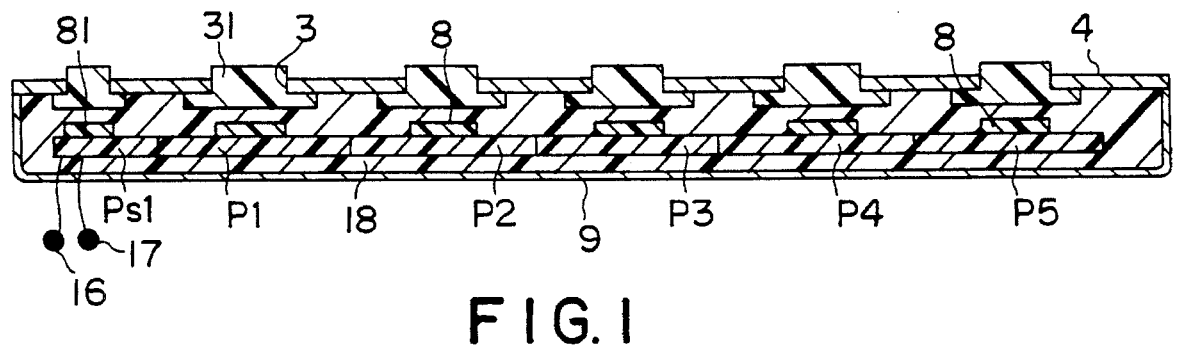
FIG. 1 is a sectional view of a number plate including luminous characters wherein the number plate is constructed according to an embodiment of the present invention.

As shown in FIG. 1, a number plate including luminous characteres (hereinafter referred to simply as a number plate) is basically constructed such that a front plate 4 is colored with a specified color to serve as a so-called number plate, a plurality of character portiones 3 are formed through the front plate 4 by punching them from the latter, a plurality of characters 31 each molded of a transparent synthetic resin corresponding to the character portions 3 are adhesively fitted into the character portions 3, and a plurality of light emitting diode assemblies 8 each lighting with e.g., a green color are disposed on the rear surface side of the front plate 4 corresponding to the character portions 3 in such a manner as to allow the characters 31 to be uniformly illuminated. Incidentally, each light emitting diode assembly 8 is usually composed of several light emitting diodes.

Figure 2:
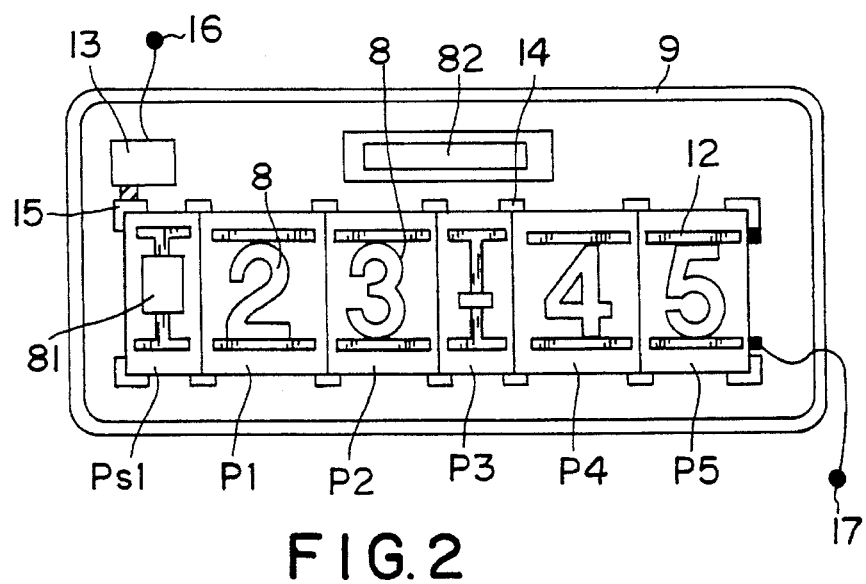
FIG. 2 is a front view of the number plate, particularly showing by way of example the internal structure of a cover.

The light emitting diode assemblies 8 are attached to printed base boards P1 to P5 firmly held in a cover 9 which faces to the front plate 4 to serve as a plate of the number plate, and each of the light emitting diode assemblies 8 exhibits the same contour as that of each character portion 3 (e.g., in the case of a numeral 2, the light emitting diode 8 exhibits a contour of the numeral 2) (see FIG. 2).

Figure 3:
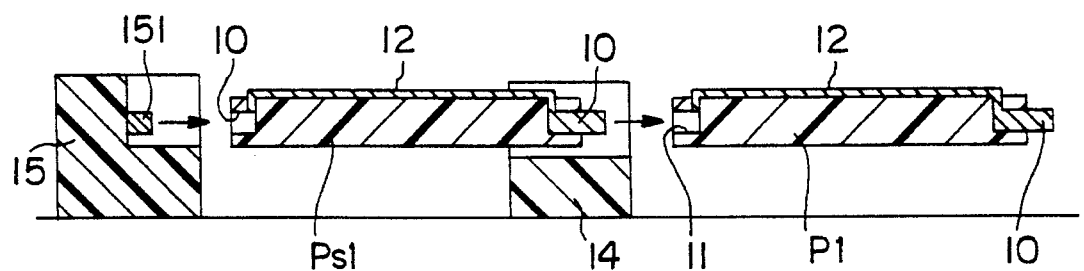
FIG. 3 is a fragmentary enlarged sectional view of the number plate, schematically showing how a printed base board is electrically connected to an adjacent one.
Figure 4:
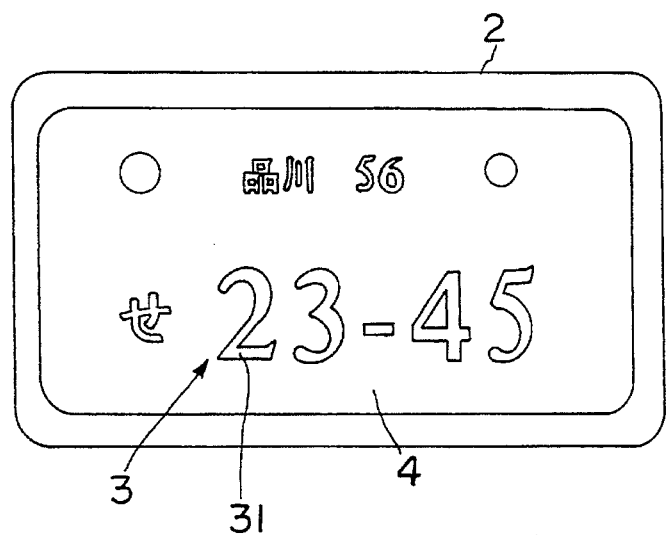
FIG. 4 is a front view of a conventional number plate including luminous characters.
Figure 5:
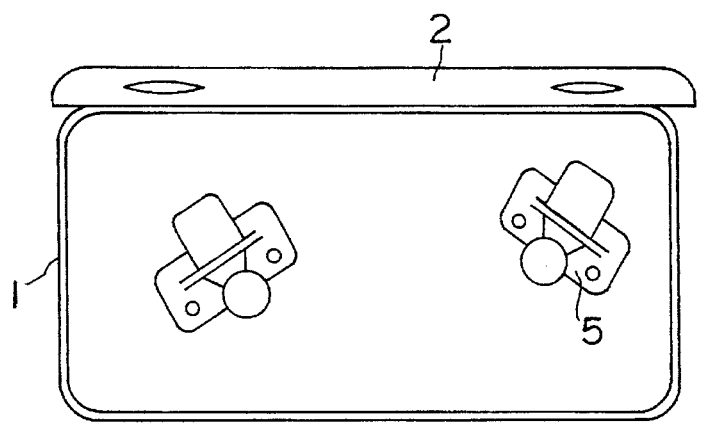
FIG. 5 is a front view of the conventional number plate, particularly showing the internal structure of the number plate while an openable frame is kept open.
Figure 6:
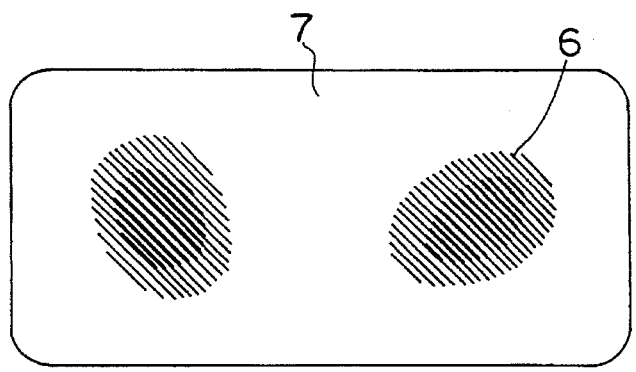
FIG. 6 is a front view of the conventional number plate, particularly showing the structure of a light scattering plate constituting the number plate.

As shown in FIG. 3, each of the printed base board P1 to P5 includes two projected terminals 10 on the end side, i.e., on the right-hand side and two recessed terminals 11 adapted to receive the projected terminals 10 on the other end side, i.e., on the left-hand side thereof, and the projected terminals 10 and the recessed terminals 11 are electrically connected to printed conductors 12 on each of the printed base boards P1 to P5.

With this construction, the respective printed base boards P1 to P5 are selectively assembled with each other by successively fitted the projected terminals 10 into the recessed terminal 11 in accordance with a predetermined order, whereby electrical connection is selectively made among the printed base boards P1 to P5. Provided that twelve kinds of block-shaped printed base boards each representing one of numerals 1 to 0, a mark "-" to be located at the central part of the front panel 4 and a Japanese character are preliminarily prepared, all the kinds of number plate can be provided by adequately combining some ones selected from the foregoing printed base boards with each other. In the case that the number plate is visually recognizably constructed by using alphabet marks, twenty six kinds of block-shaped printed base boards are preliminarily prepared. In this case, since light emitting diodes assembly 8 are disposed only on parts on the printed base boards corresponding to the character portions, the total number of light emitting diodes practically used for the number plate can remarkably be reduced, and moreover, the respective character portions can uniformly be illuminated.

Usually, a Japanese character is assigned to the part on the front plate 4 identified by a printed base board Ps1. Although many kinds of characters are practically used for the foregoing part which occupies a small area compared with each numeral portion, a light emitting diode assembly 81 having a rectangular contour is employed for the printed base board Ps1. The printed base board Ps1 includes projected terminals 10 and recessed terminal 11 in the same manner as mentioned above so that it can be connected to and assembled with the printed base boards P1 to P5.

In this country, the part on the front plate 4 identified by a printed base board Ps2 is used as a part employable for identifying the local area in this country and kind of vehicle now in use, and a Chinese character and numeral marks are practically assigned to the printed base board Ps2. Also in this case, it is necessary that a light emitting diode assembly 82 is disposed on the printed base board Ps2 so as to allow the Chinese character and the numeral marks to be uniformly illuminated.

An assembly consisting of the block-shaped printed base plates P1 to P5 and Ps1 is placed on a support member 14 secured to the cover 9. A support member 15 located at the left upper corner of the foregoing assembly serves an anode terminal including a projected terminal 151 adapted to be fitted into the recessed terminal 11 of the printed base plate Ps1. The projected terminal 151 is electrically connected to an integrated circuit 13 and an anode terminal 16 which in turn is connected to a supply source (not shown). The anode terminal 16 is electrically connected to the plus side of each of the light emitting diode assemblies 81 and 8 via the projected terminals 151 and 10, the recessed terminal 11 and the printed conductors 12. On the other hand, a ground terminal 17 is likewise electrically connected to the minus side of the light emitting diode assemblies 8 and 81 via projected terminals 151 and 10, the recessed terminal 11 and the printed conductors 12. Thus, the anode terminal 16 is electrically connected to each of a plurality of light emitting diode assemblies 8 in the parallel relationship, and moreover, the minus side of each of the light emitting diode assemblies 8 is likewise electrically connected to the ground terminal 17 in the parallel relationship.

After the printed base boards P1 to P5 and Ps1 having a plurality of light emitting diode assemblies P1 to P5 and Ps1 disposed thereon corresponding to the characters 31 are engaged with the support portions 14 and 15, they are fixedly placed on the rear surface of the front plate 4, and thereafter, they are embedded in a transparent synthetic resin 18 by injection-molding the latter so as to allow the interior of the cover 9 to be filled with the transparent synthetic resin 18. Consequently, the printed base boards P1 to P5 and Ps1 and the light emitting diode assemblies 8 and 81 are embedded in the transparent synthetic resin 18 while the latter is integrated with the front plate 4 and the cover 9.

With the number plate of the present invention constructed in the above-described manner, when the anode terminal 16 for the printed base boards P1 to P5 and Ps1 is electrically connected to the power source and the ground terminal 17 is electrically connected to a ground of the vehicle, a plurality of light emitting diode assemblies 8 and 81 fitted to the printed base plates P1 to P5 and Ps1 are illuminated with the supplied electricity. At this time, since the light emitting diode assemblies 8 are arranged with the same contour as that of each character portion 3, and each transparent or translucent character 31 is fitted to the corresponding character portion 3, all the character portions 3 on the front plate 4 are uniformly illuminated. In addition, since the transparent resin layer 18 serves to dispersively scatter the light beam emitted from the light emitting diode assemblies 8 and 81, this leads to the result that the characters 31 are more uniformly illuminated. Additionally, since each of the printed base plates P1 to P5 is designed to exhibit an independent block in such a manner as to enable them to be connected to and disconnected from each other, a number plate having a various kind of character row arranged thereon can be provided.

Further, the printed base plates P1 to P5 and Ps1 are closed with the cover 9 located on the rear surface side of the front plate 4, the interior of the cover 9 is filled with the transparent synthetic resin 18, and moreover, the front plate 4 is integrated with the printed base boards P1 to P5 and Ps1 via the transparent synthetic resin 18. Thus, when somebody intentionally disconnects the characters 31 from the front plate 4 in order exchange them with another ones, all the printed base boards are broken, resulting in falsification of the number plate becoming impossible. Consequently, an advantageous effect of the present invention is that there does not arise a malfunction that properties of the light emitting diode assemblies and the printed base boards are degraded due to invasion of water, dust or a similar foreign material, because they are embedded in the transparent synthetic resin. In addition, another advantageous effect of the same is that the number plate of the present invention has long durability.

While the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. A number plate including luminous characters, comprising:
   a front plate having a plurality of character portions punched therefrom for serving as a number plate,
   a plurality of characters each molded of an at least light transmissive synthetic resin, said characters being adhesively fitted into said character portions,
   a plurality of light emitting diode assemblies arranged on a rear surface side of said front plate at positions located corresponding to said character portions,
   a cover secured to the rear surface of said front plate and having said light emitting diode assemblies accommodated in an interior of said cover, and
   a transparent synthetic resin filled in the interior of said cover so as to allow said light emitting diode assemblies to be embedded in said transparent synthetic resin.

2. The number plate as claimed in claim 1, wherein each of said light emitting diode assemblies is fitted to a printed base board.

3. A number plate including luminous characters, comprising:
   a front plate having a plurality of character portions punched therefrom for serving as a number plate;
   a plurality of characters each molded of an at least light transmissive synthetic resin, said characters being adhesively fitted into said character portions,
   a plurality of light emitting diode assemblies arranged on a rear surface side of said front plate at positions located corresponding to said character portions,
   a cover secured to the rear surface side of said front plate and having said light emitting diode assemblies accommodated in an interior of said cover, and
   a plurality of printed base boards having said diode assemblies arranged at the positions corresponding to said character portions, said plurality of printed base boards being connectable to and disconnectable from each other, and wherein
   said cover includes a support member for supporting said base boards connected to each other in side by side relationship,
   each of said base boards includes two projecting terminals on one end side and two recessed terminals on another end side thereof in such a manner as to allow two projecting terminals to be engaged with and disengaged from two recessed terminals on an adjacent said base board, said projecting terminals and said recessed terminals being disposed on each of said base boards to be electrically connected to printed conductors which in turn are electrically connected to an anode terminal and a ground terminal, and
   said support member includes a projecting terminal at a corner portion thereof in such a manner as to enable said projecting terminal of said support member to be disconnectably connected to said recessed terminal of said base board, said projecting terminal being electrically connected to a power source.

4. The number plate as claimed in claim 3, wherein each of said base boards is electrically connected to one of said anode terminal and said ground terminal via said light emitting diode assemblies.

5. A number plate including luminous characters wherein character portions are punched from a front plate, at least light transmissive characters each molded of a light transmissive synthetic resin are adhesively fitted into the punched character portions, and light emitting diode assemblies are arranged at positions corresponding to the character portions and covered by a cover, characterized in that
   the light emitting diode assemblies are arranged with a contour corresponding to the character portions, base boards connectable to and disconnectable from each other include printed conductors which are connected to an anode terminal and a ground terminal via the light emitting diode assemblies, each of the base boards includes two projected terminals on one end side and two recessed terminals on an other end side thereof in such a manner as to allow two projected terminals to be engaged with and disengaged from two recessed terminals, said projected terminals and said recessed terminals being disposed on each of the base boards to be electrically connected to the printed conductors; and
   a support member disposed to support the base boards, said support member including a projected terminal at a corner portion in such a manner as to enable said projected terminal to be disconnectably connected to said recessed terminal, said projected terminal being electrically connected to a power source.

6. The number plate as claimed in claim 3, 4, or 5, wherein the interior of said cover is filled with a transparent synthetic resin.

* * * * *